(No Model.)

H. V. SMITH.
TOOL HOLDER.

No. 501,110. Patented July 11, 1893.

Witnesses:
Joseph Arthur Cantin.
Arthur B. Jenkins.

Inventor:
Henry V. Smith.
by Chas. L. Burdett,
Attorney

UNITED STATES PATENT OFFICE.

HENRY V. SMITH, OF HARTFORD, CONNECTICUT.

TOOL-HOLDER.

SPECIFICATION forming part of Letters Patent No. 501,110, dated July 11, 1893.

Application filed December 29, 1892. Serial No. 456,630. (No model.)

*To all whom it may concern:*

Be it known that I, HENRY V. SMITH, of Hartford, in the county of Hartford and State of Connecticut, have invented certain new and useful Improvements in Tool-Holders, of which the following is a full, clear, and exact description, whereby any one skilled in the art can make and use the same.

The object of my invention is to provide means whereby two members of a device may be firmly and securely joined with the exertion of a very small amount of power, the invention being especially applicable for use in connection with various sizes or kinds of tools, as for instance, in a bit-stock or in a handle to which it is desired to secure a screw-driver, a bit, a reamer, or the like; and a further object of my invention is to provide such a fastening means that shall be simple and cheap in construction, positive in action and one that will present a neat and compact appearance.

To this end my invention consists in the details of the several parts making up the device as a whole and in the combination of such parts, as more particularly hereinafter described and pointed out in the claims.

Figure 1:
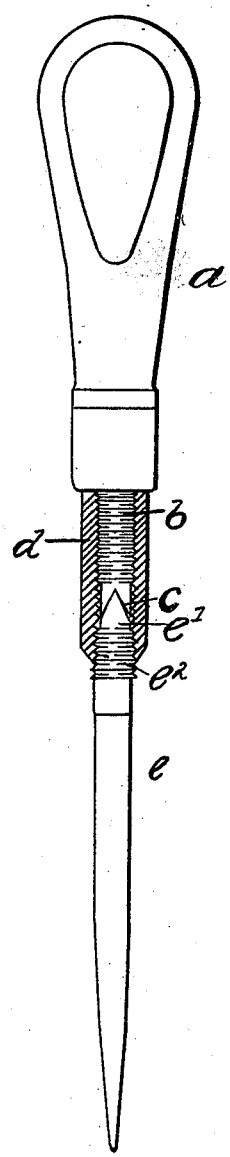
Figure 2:
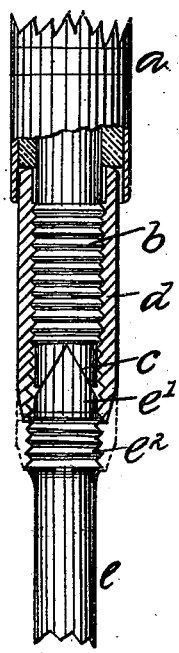
Figure 3:

Referring to the drawings: Figure 1 is a detail view of a screw-driver embodying my invention with parts cut away to show construction. Fig. 2 is a detail view in central section on enlarged scale through the coupling parts. Fig. 3 is a detail top view of the end of the tool shank.

My invention as described within has particular reference to a tool, in connection with which it finds its most common use, in that simple and convenient means are provided to securely fasten different sizes of blades or tools to a handle; but my invention is not limited to such uses as it is obviously applicable for the purpose of coupling other parts in which it is desired to renew or remove either of the parts that are temporarily united.

In the accompanying drawings the letter $a$ denotes a tool handle; $b$ a stem that is preferably smaller in diameter than the handle and projects from it, the stem being provided with a thread of any desired pitch. In the end of the stem a socket $c$ is formed that is adapted to receive a corresponding part borne on the shank of the tool that is to be secured to the handle. A coupling $d$ is fitted to the shank, the thread in the coupling corresponding to the thread formed on the shank for a part of the length of the coupling. The shank $e'$ of a tool $e$ is so shaped on its end as to enable it to engage the socket on the shank in such manner as to prevent the tool from rotating on its axis while the stem and shank are engaged. It is not essential that a specific socket should be formed in the end of the stem or on the end of the shank, but merely that there should be some such formation of these two adjacent ends of the shank and stem as will enable them to be placed together and held by the coupling (which embraces both the parts and overlies the point between them) so that the tool cannot rotate on its axis.

The form of interengaging parts comprising a V-shaped socket in the end of one of the parts and a wedge shaped end on the end of the opposite part is the form of engaging parts preferred on account of the simplicity and ease of construction.

The end of the tool shank is provided with a thread $e^2$, preferably one coarser in pitch than that on the stem of the handle and the coupling sleeve has a thread that corresponds in pitch with the thread on the tool shank. It is preferred that the thread on the one part shall be coarser than that on the other, although a right and left hand screw may be used on the respective parts, the thread within the sleeve, of course, corresponding with the threads on the shank and stem. The best results, however, are gained when the coupling parts are constructed as described within.

The operation of the device is as follows: On the screw end of one of the two parts to be united (preferably the handle part in case of a tool) the sleeve is fitted and turned nearly its whole length upon the part. The two parts to be united are then brought end to end and engaged as by inserting the wedge-shaped end of the one into the socket in the other and the sleeve is then run out by turning until the thread within it engages the thread on the second part and in case the threads are of different pitch, as described, a point is soon reached where the two parts are drawn firmly together endwise toward each other and the interengaging parts so locked in position as to prevent either from turning on the other. The parts thus united are held with great firmness against such separation as would enable either to turn freely of the other, and this is done quickly and with the exercise of but slight power upon the coupling sleeve. The parts can be readily uncoupled by simply turning the sleeve in an opposite direction.

I claim as my invention—

1. In combination with a tool handle, a stem having a threaded end, a V-shaped socket in the end of the stem, a tool having a shank with a wedge shaped engaging part adapted to fit the socket in the stem and having a threaded shank of different pitch from the thread on the stem, and a coupling sleeve having an internal thread fitting the threads on the ends of the stem and shank respectively, all substantially as described.

2. In a coupling device, two members adapted to be secured together and provided on their adjacent ends with screw threads and with engaging means whereby the rotation of one part independent of the other is prevented, the thread on one part being finer in pitch than that on the other part, and a sleeve provided with interior threads fitting the respective threads on the said parts, all substantially as described.

3. In a coupling device, two members adapted to be secured together and provided on their adjacent ends with screw threads and with engaging means whereby the rotation of one part independent of the other is prevented, the threads on the two parts extending in the same direction and that upon one part being finer in pitch than that upon the other, and a screw threaded sleeve fitting the respective screw threads upon said parts, all substantially as described.

HENRY V. SMITH.

Witnesses:
CHAS. L. BURDETT,
ARTHUR B. JENKINS.